US011601795B2

(12) United States Patent
Sangle et al.

(10) Patent No.: US 11,601,795 B2
(45) Date of Patent: Mar. 7, 2023

(54) EMERGENCY CALLING IN A FIFTH GENERATION (5G) NEW

(71) Applicant: APPLE INC., Cupertino, CA (US)

(72) Inventors: Parshuram Sangle, Bangalore (IN); Usharani Ayyalasomayajula, Bangalore (IN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/294,311

(22) PCT Filed: Nov. 14, 2019

(86) PCT No.: PCT/US2019/061548
§ 371 (c)(1),
(2) Date: May 14, 2021

(87) PCT Pub. No.: WO2020/102588
PCT Pub. Date: May 22, 2020

(65) Prior Publication Data
US 2022/0022019 A1 Jan. 20, 2022

Related U.S. Application Data

(60) Provisional application No. 62/768,757, filed on Nov. 16, 2018.

(51) Int. Cl.
*H04W 4/90* (2018.01)
*H04W 76/50* (2018.01)
*H04L 65/1016* (2022.01)

(52) U.S. Cl.
CPC ........... *H04W 4/90* (2018.02); *H04L 65/1016* (2013.01); *H04W 76/50* (2018.02)

(58) Field of Classification Search
CPC .......................... H04W 76/50; H04L 65/1016
(Continued)

(56) References Cited

U.S. PATENT DOCUMENTS

| 2003/0012344 A1* | 1/2003 | Agarwal | H04M 11/045 |
| | | | 379/37 |
| 2004/0086093 A1* | 5/2004 | Schranz | H04L 65/1104 |
| | | | 340/531 |

(Continued)

FOREIGN PATENT DOCUMENTS

WO 2008041141 A1 4/2008

OTHER PUBLICATIONS

3GPP TS 34.229-1, et al., "3rd Generation Partnership Project; Technical Specification Group Radio Access Network; Internet Protocol (IP) multimedia call control protocol based on Session Initiation Protocol (SIP) and Session Description Protocol (SDP); User Equipment (UE) conforman", V14.4.0 ,Sep. 2018, pp. 347-442.

(Continued)

*Primary Examiner* — Maria El-Zoobi
(74) *Attorney, Agent, or Firm* — Dorsey & Whitney LLP

(57) ABSTRACT

Technology for a user equipment (UE) operable to encode an emergency contact list for transmission to an emergency center is disclosed. The UE can initiate an emergency call with the emergency center. The UE can identify the emergency contact list stored at the UE. The UE can encode a message that includes the emergency contact list for transmission to the emergency center via a network device to enable an operator at the emergency center to identify an emergency contact on the emergency contact list.

20 Claims, 14 Drawing Sheets

(58) Field of Classification Search
USPC .................................. 455/404.1; 379/45–52
See application file for complete search history.

(56) References Cited

U.S. PATENT DOCUMENTS

| | | |
|---|---|---|
| 2008/0152112 A1 | 6/2008 | Gayde et al. |
| 2014/0370834 A1* | 12/2014 | Liu .................. H04W 4/16 |
| | | 455/404.1 |
| 2016/0269535 A1 | 9/2016 | Balabhadruni et al. |
| 2017/0105055 A1* | 4/2017 | Lee .................. H04N 21/439 |
| 2017/0156045 A1 | 6/2017 | Balabhadruni et al. |
| 2017/0366955 A1* | 12/2017 | Edge .................. H04W 4/90 |

OTHER PUBLICATIONS

PCT/US2019/061548, et al., International Search Report and Written Opinion, dated Mar. 16, 2020, 9 pages.

* cited by examiner

```
<?xml version="1.0" encoding="UTF-8"?>
<xs:schema
    xmlns="urn:ietf:params:xml:ns:emergency-contact-list"
    xmlns:xs="http://www.w3.org/2001/XMLSchema">

<xs:import namespace="urn:ietf:params:xml:ns:emergency-contact-list"
        schemaLocation="urn:ietf:params:xml:schema:emergency-contact-list"/>

<xs:attribute name="name" type="xs:string" use="required"/>
    <xs:attribute name="phone" use="required"/>
        <xsd:simpleType>
            <xsd:restriction base="xsd:string">
                <xsd:pattern value="\([0-9]{3}\) [0-9]{3}-[0-9]{4}"/>
            </xsd:restriction>
        </xsd:simpleType>
    </xs:attribute>
    <xs:attribute name="relation" type="xs:string" use="optional" default=""/>

</xs:schema>
```

FIG. 5

| Command | Possible response(s) |
|---|---|
| +CECL=<count>[,<contact_list>] | +CME ERROR: <err> |
| +CECL? | +CECL: <support> |

FIG. 6

```
INVITE urn:service:sos SIP/2.0
Via:
From: <sip:user1@home1.net>; tag=171828
To:
Call-ID:
Cseq: 1 INVITE
Contact:
Accept: application/sdp,application/emergency-contact-list+xml
Content-Type: multipart/mixed; boundary="boundary1"
Content-Length: (...)

--boundary1
Content-Type: application/sdp
<SDP contents goes here>

--boundary1
Content-Type: application/pidf+xml
<Location information goes here>

--boundary1
Content-Type: application/emergency-contact-list+xml
Content-Disposition: emergency-contact-list <?xml version="1.0" encoding="UTF-8"?>
<contact-list xmlns="urn:ietf:params:xml:ns:emergency-contact-list">
    <entry name="John Somers" phone="+1-234-567-8900" relation="Father"/>
    <entry name="Dr.Eric Maxwell" phone="+1-567-123-4560" relation="Doctor"/>
</contact-list>
--boundary1--
```

FIG. 7

EMERGENCY CALLING IN A FIFTH GENERATION (5G) NEW

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 illustrates an Extensible Markup Language (XML) schema definition for an emergency contact list format in accordance with an example;

FIG. 6 is a table of commands and responses in accordance with an attention (AT) command syntax in accordance with an example;

FIG. 7 illustrates an INVITE request message with an emergency contact list in accordance with an example;

and

Figure 15:
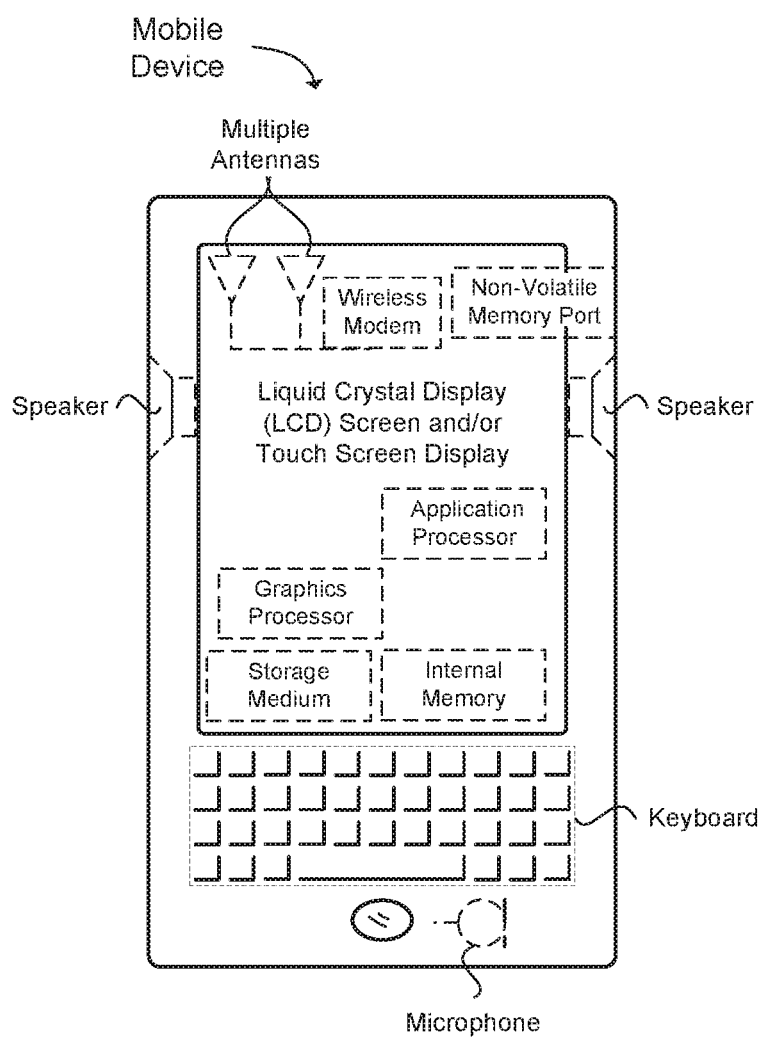

FIG. 15 illustrates a diagram of a wireless device (e.g., UE) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
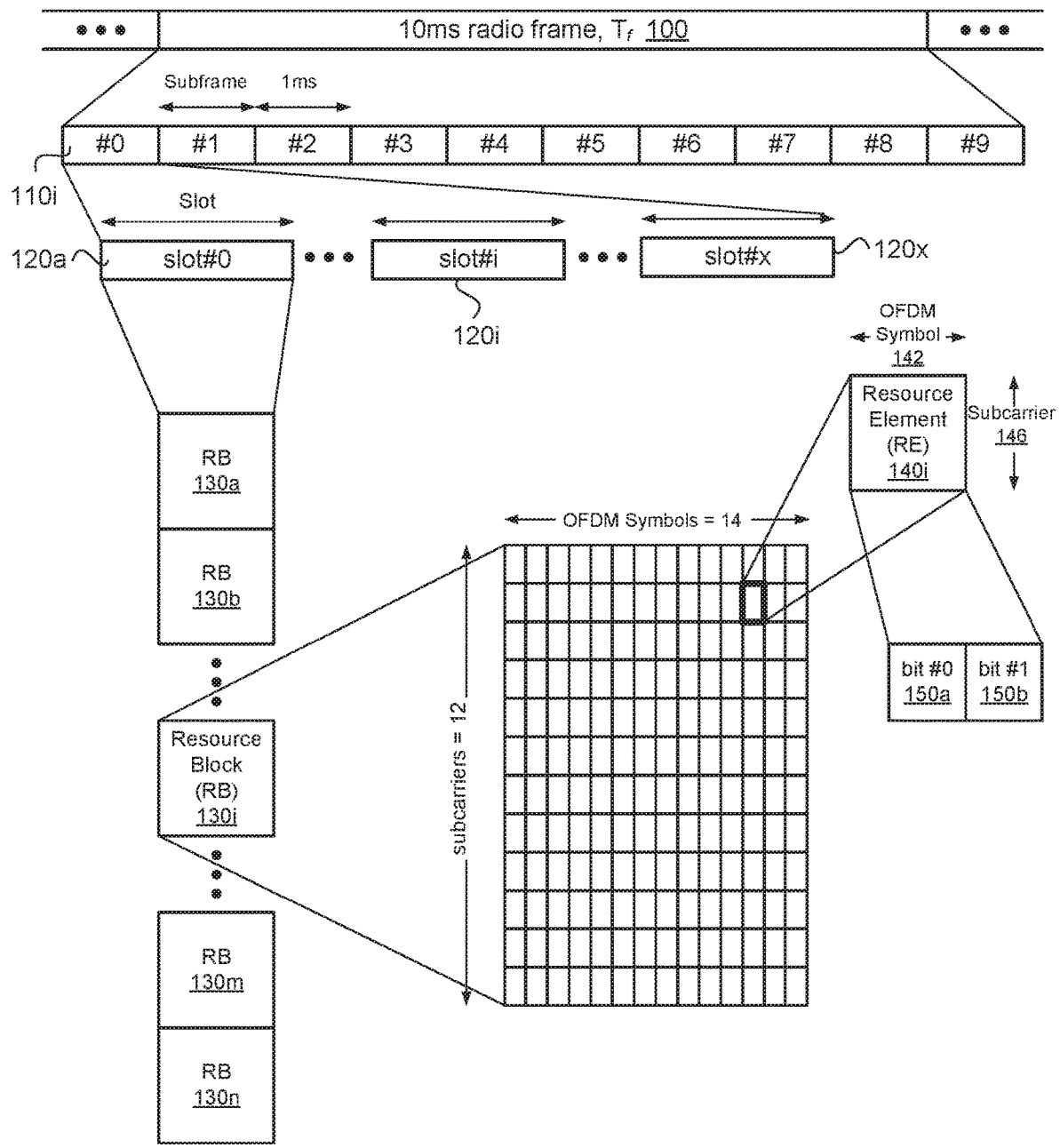
FIG. 1 illustrates a block diagram of a Third-Generation Partnership Project (3GPP) New Radio (NR) Release 15 frame structure in accordance with an example.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/μms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140i can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one example, during emergency situations, a person in an emergency may not be in position to convey all the necessary information to an emergency center operator, which could be due to the person's health conditions or due to network issues during the emergency call. In such cases, family members, friends, neighbors or people aware about one's medical conditions can help the person during the emergency by providing necessary information to the emergency center operator. In many cases, these people can even rescue the person involved in the emergency faster than emergency service personnel. Thus, it is vital for the emergency center operator to have access to one's personal emergency contacts/in case of emergency (ICE) numbers. Availability of emergency contact information during the emergency call setup can help expedite rescue or local aid operations resulting in better handling of emergency situations. A mechanism is needed to bring the person in emergency, important ICE contacts and a public safety answering point (PSAP) operator in a conference call to gather important information for providing quick aid and guiding first emergency respondents.

In one example, in 3GPP Release 8, mechanism to store and locally access ICE information from a subscriber identity module (SIM) was standardized. ICE information is stored in Elementary Files (EFs), namely ICE-Dialing Numbers ($EF_{ICE-DN}$) and ICE-Free Format ($EF_{ICE-FF}$). This ICE information is optionally configured by a user on a Universal Mobile Telecommunications System Subscriber SIM (USIM) and can be displayed on a locked phone screen on entering a special key sequence (***). This information is typically meant to be accessed by first responders who arrive at the spot.

However, with the 3GPP Release 8 mechanism being an optional configuration, many operators may not enable this feature and many users choose not to enter ICE information. Hence, during an emergency call, the PSAP can be unaware of ICE information. Further, since this information is stored on the SIM, it becomes non-applicable for scenarios where the user makes emergency calls from device without a SIM or a Universal Integrated Circuit Card (UICC). Therefore, there is no current standardized mechanism for the PSAP to store and obtain access to ICE information from a UE or a home subscriber server (HSS).

In one configuration, during an emergency call setup over a Long Term Evolution (LTE) or Fifth Generation (5G) New Radio (NR) system, an emergency/ICE contact list is embedded in a body of session initiation protocol (SIP) signaling messages like INVITE/INFO. This contact list can be retrieved from pre-configured emergency contact information in mobile equipment (ME) and sent in the body of the SIP message along with media and location information. Similar to location information, the emergency contact list can be made available to the emergency center and/or PSAP operator who can contact relevant people for additional information or can setup a conference call with members on the emergency contact list or during a PSAP callback.

In the present technology, mechanisms are described herein to retrieve, embed and transfer personal emergency contact information in SIP signaling messages. Further, a mechanism to establish a conference and add participants from an emergency contact list during an ongoing emergency call or during a PSAP callback is described herein. Further, various changes to emergency call flows, SIP messages, etc. are defined herein.

Figure 2:
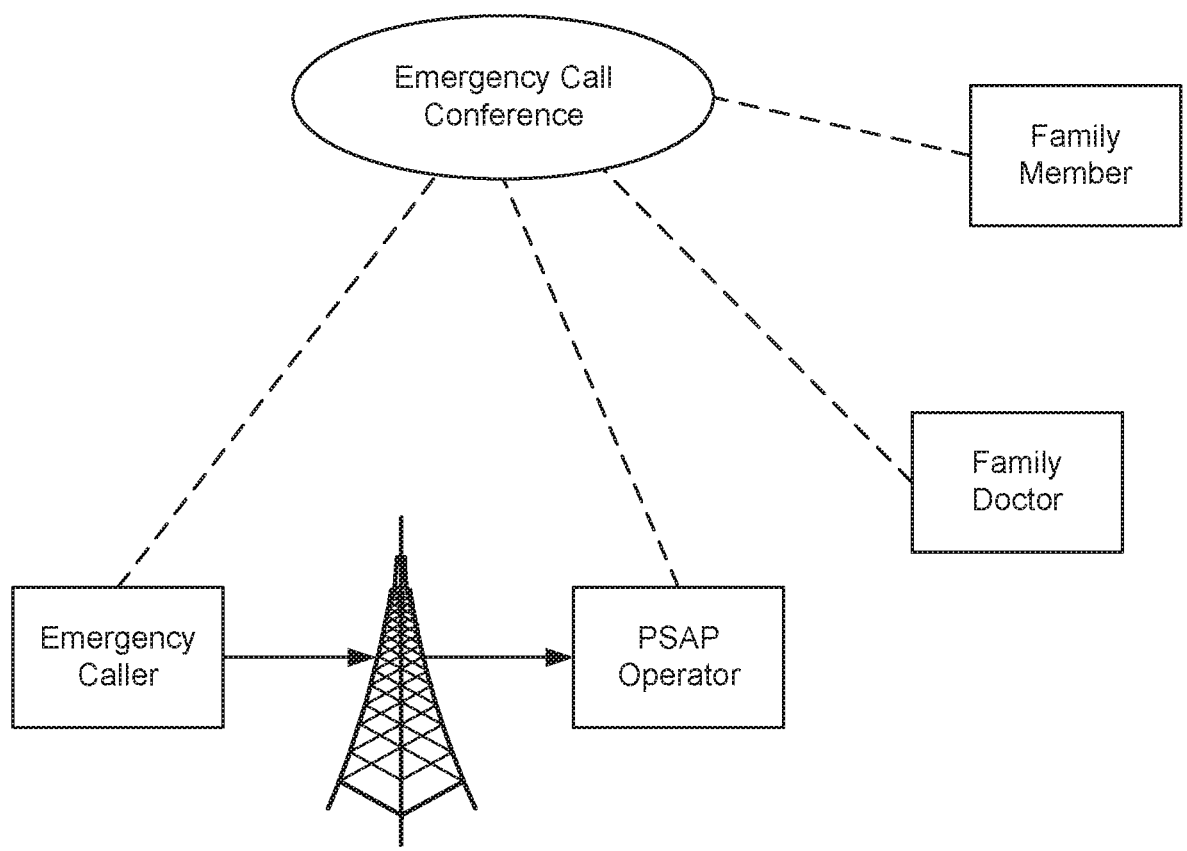
FIG. 2 illustrates a transfer of emergency contacts and a creation of an emergency call conference with people in the emergency contacts in accordance with an example.

FIG. 2 illustrates an example of a transfer of emergency contacts and a creation of an emergency call conference with people in the emergency contacts. For example, in a medical emergency, emergency contacts can be transferred to a PSAP during a call setup and a PSAP operator can create a conference with people in the emergency contact list (e.g., family doctor, family members).

In one example, there are several benefits of emergency contacts transfer to the PSAP. For example, a lack of particular information from the person in the emergency can create a hindrance in the rescue and can delay aid. Further, an emergency call can be dropped before necessary information is available to the PSAP operator. Even if a PSAP callback setup fails, the PSAP operator can reach out to emergency contacts for getting information about the person in the emergency. Further, for people dialing emergency calls from devices with no SIM or from locations where there is limited network coverage, PSAP callbacks are not possible for such devices, and so emergency contacts could help the PSAP operator with additional information. Further, for emergency calls where location information is not retrieved and the person in the emergency is not able to convey location details, the emergency contacts could provide necessary details.

Figure 3:
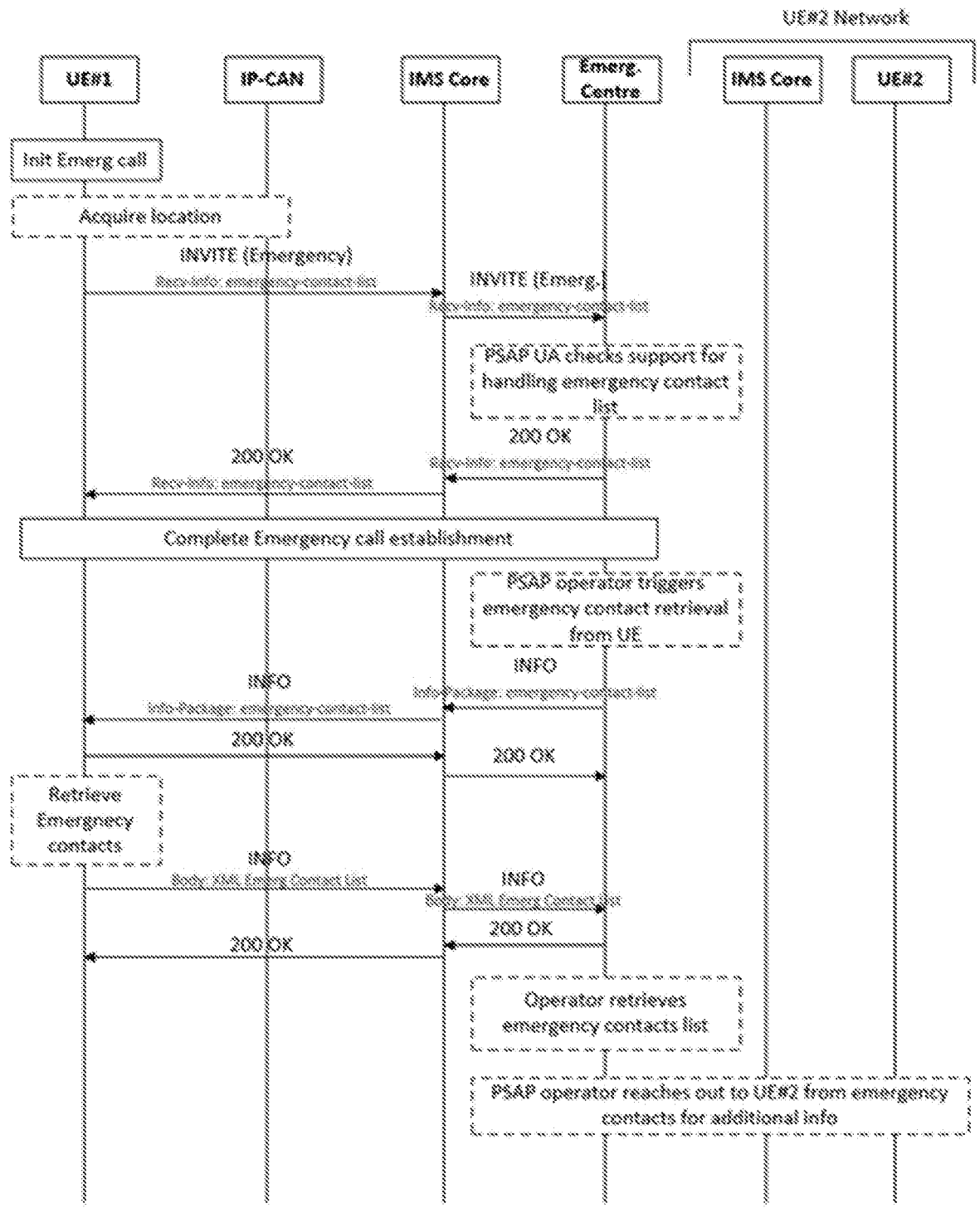
FIG. 3 illustrates an emergency contact retrieval using an INFO mechanism in accordance with an example.

In one example, a signaling flow overview for transfer of emergency contacts list is described below. In a first example, UE and network support can be indicated during a call setup, and retrieval of emergency contacts can be achieved using an in-dialog INFO request FIG. 3 illustrates an example of an emergency contact retrieval using an INFO mechanism. In this example, a UE can indicate its support to send emergency contacts by inserting an Recv-Info header with value emergency-contact-list in an initial emergency INVITE message. If the network supports the retrieval and processing of emergency contacts, such can be indicated by inserting an Recv-Info header with value emergency-contact-list in a 200 OK response. After an emergency call setup is complete, a PSAP operator can trigger retrieval of the emergency contact list from the UE by sending an INFO request with an Info-Package header set to value emergency-contact-list. Further, the UE can construct an Extensible Markup Language (XML) body with emergency contacts and send this information to the PSAP in a subsequent INFO message. The PSAP operator can retrieve the contact list and can reach out to people in the emergency contact list.

More specifically, as shown in FIG. 3, a UE #1 can initiate an emergency call. The UE #1 and an Internet Protocol connectivity access network (IP-CAN) can acquire location information. The UE #1 can send an INVITE (emergency) message having the Recv-Info header with value emergency-contact-list to an IP Multimedia Subsystem (IMS) core, which can be forwarded to an emergency center. At the emergency center, a PSAP user agent (UA) can check support for handling the emergency contact list. The emergency center can send a 200 OK message to the IMS core, which can then forward the 200 OK message to the UE #1. The UE #1 and the emergency center can complete an emergency call establishment. At the emergency center, a PSAP operator can trigger an emergency contact retrieval from the UE. For example, the emergency center can send an INFO request to the IMS core, which can then forward the INFO request to the UE #1. The UE #1 can send a 200 OK message to the IMS core, which can forward the 200 OK message to the emergency center. The UE #1 can retrieve emergency contacts, and then send an INFO message having the emergency contact list to the IMS core, which can forward the INFO message having the emergency contact list to the emergency center. The emergency center can respond with a 200 OK message to the UE #1 via the IMS core. At the emergency center, the PSAP operator can retrieve the emergency contacts list. The PSAP operator can reach out to UE #2 from the emergency contacts list for additional information.

In this example, emergency contacts can be sent only after confirming both UE and network support. If the emergency contacts were added to the initial INVITE, such information would expand the INVITE message body which already has media and location information. However, in this example, if the emergency call setup and even the PSAP callback fails before emergency contacts are retrieved, the PSAP operator has no other way to get important details.

Figure 4:
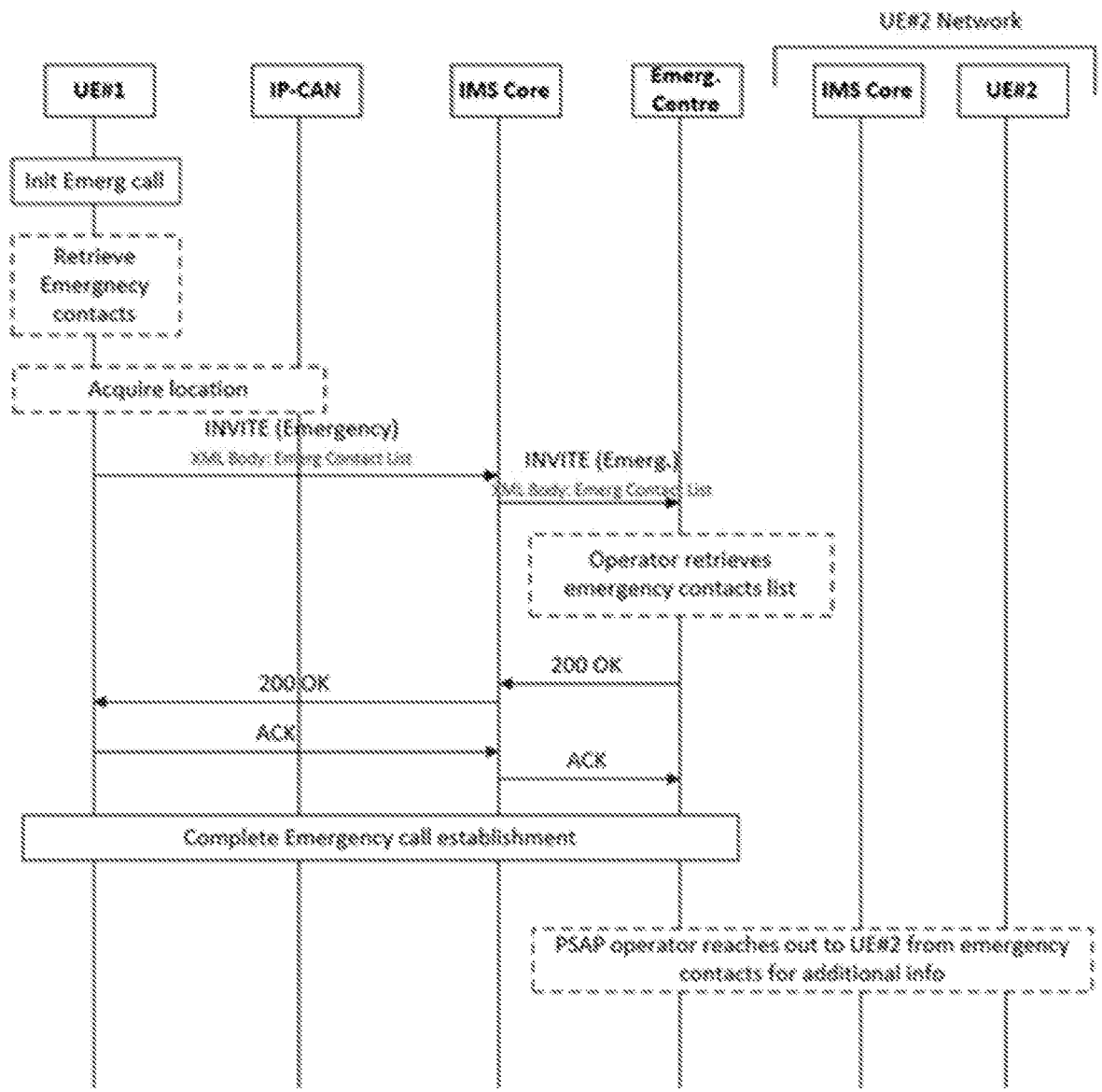
FIG. 4 illustrates an emergency contract list transfer in an initial emergency INVITE message in accordance with an example.

FIG. 4 illustrates an example of an emergency contract list transfer in an initial emergency INVITE message. In this second example, emergency contacts can be sent in an initial INVITE without querying for network support. In this example, upon initiation of an emergency call by a user at UE #1, a pre-configured personal emergency contact list can be retrieved. The contact list can be added to the body of an emergency INVITE request. Details of the additional fields in the emergency INVITE request are provided below. Further, a UA at the PSAP can retrieve this contact list and is made available to the PSAP operator. Once an emergency call setup is complete, the PSAP operator can check whether there is a need to contact people from the emergency contact list. The PSAP operator can reach out to people in the emergency contact list by setting up separate calls. In case the emergency call is dropped, the PSAP operator could possibly setup a conference with emergency contacts and add PSAP callback with UE #1 to the conference.

More specifically, as shown in FIG. 4, a UE #1 can initiate an emergency call and retrieve emergency contacts. The UE #1 and an IP-CAN can acquire location information. The UE #1 can send an INVITE (emergency) message with the emergency contact list to the IMS core, which can forward the INVITE (emergency) message with the emergency contact list to an emergency center. An operator at the emergency center can retrieve the emergency contacts list. The emergency center can send a 200 OK message to the IMS core, which can forward the 200 OK message to the UE #1. The UE #1 can send an acknowledgement (ACK) to the IMS core, which can forward the ACK to the emergency center. The UE #1 and the emergency center can complete an emergency call establishment. A PSAP operator can reach out to UE #2 from the emergency contacts for additional information.

In one example, with respect to a configuration and retrieval of emergency contacts, many of the mobile equipment manufacturers provide options to add emergency contacts or In Case of Emergency (ICE) numbers in address books. Operating systems running on these devices can provide access to these contacts which is utilized for retrieval of this information when a user dials an emergency call. If ICE Dialing Numbers (EFICE-DN) are available on a SIM/UICC, these numbers can be retrieved using interfaces provided by a USIM application. Further, a retrieved contact list can be formatted into a standard format like XML which is suitable for embedding into a SIP message body.

FIG. 5 illustrates an example of an XML schema definition for an emergency contact list format. A retrieved contact list can be formatted into XML, which can be suitable for embedding into a SIP message body. Further, a phone number field in the XML schema can be extended to support SIP or Tel Uniform Resource Identifier (URI).

In one example, an XML formatted contact list can be provided to an entity responsible for formatting SIP signaling messages. When such an XML string is to be sent from an application processor to a communication processor, then an interface, such as an attention (AT) interface, can be enhanced with additional commands.

FIG. 6 is an example of a table of commands and responses in accordance with an attention (AT) command syntax. More specifically, an AT command can be to set an emergency contact list +CECL, and the table can show a +CECL command syntax. For example, as shown, a command can be +CECL=<count>[,<contact_list>], and a possible response can be +CME ERROR: <err>, or a command can be +CECL?, and a possible response can be +CECL: <support>.

In one example, a set command can allow an emergency contact list to be sent in form of a XML-formatted string. A result of the command handling and parsing XML string can be reported as a response code. A query command can indicate the UE support for sending emergency contacts during emergency call. The commands and responses can have various values, such as <count>, <contact_list>, or <support>. Here, <count> can be an integer type and can indicate a number of emergency contact entries sent in the XML formatted string. A value of "0" signifies no emergency contact entries are available. Further, an upper limit of 5 is set for the maximum contact entries to be sent. Further, <contact_list> is a string type in Unicode Transformation Format (UTF) and this parameter can provide an XML-formatted string of an emergency contact list in a format similar to the XML schema defined above. Further, <support> is an integer type and indicates UE support for sending emergency contacts during an emergency call is available. Here, a value of "0" can indicate that sending emergency contacts during an emergency call is not supported by the UE, and a value of "1" can indicate that sending emergency contacts during emergency call is supported by the UE.

In one example, with respect to embedding an emergency contacts list in a SIP signaling message, a body of an Emergency INVITE message typically carries session description protocol (SDP) and location information, if available. An emergency contact list XML can be added as another body part to the INVITE message multipart body. Further, a new Accept format, application/emergency-contact-list+xml can be added to indicate support for the new format for the XML body consisting of the emergency contact list. Further, by defining a new content type, namely application/emergency-contact-list+xml, a list of emergency contacts in XML format can be added to the multipart MIME body (for which the XML schema definition is provided in FIG. 5). Further, a new content disposition header value emergency-contact-list can be added to describe how the multipart body segment is interpreted by the UA at the PSAP. This contact list can be made available to the PSAP operator for further use.

FIG. 7 illustrates an example of an INVITE request message with an emergency contact list. The INVITE request message can be sent for an emergency call setup. The INVITE request message can include the emergency contact list, a new Accept format, application/emergency-contact-list+xml, a new content type corresponding to application/emergency-contact-list+xml, a new content disposition header value emergency-contact-list, etc., as described above.

In one example, with respect to a conference setup at the PSAP, depending on the situation and on getting consent from the user, the PSAP operator can decide to setup a conference with contacts received in the emergency contact list. The PSAP operator can temporarily hold the emergency call, which can allow the PSAP operator to initiate the conference and add necessary participants from the emergency contacts. Further, various mechanisms can be used for creating a conference using a conference application and adding participants by dialing out numbers.

Figure 8:
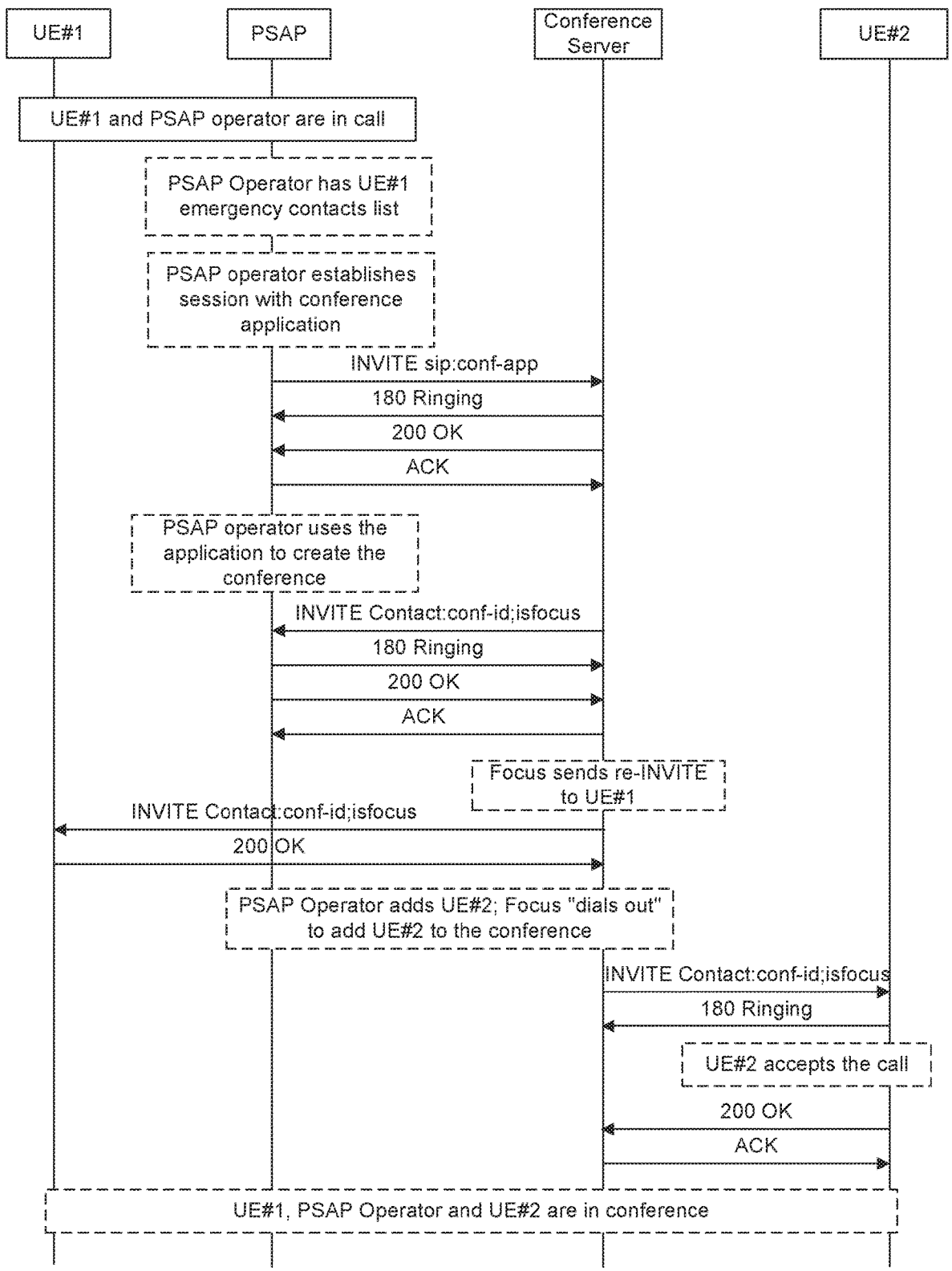
FIG. 8 illustrates a conference setup during an emergency call in accordance with an example.

FIG. 8 illustrates an example of a conference setup during an emergency call. As shown, a UE #1 and a PSAP operator can be on a call. The PSAP operator can have UE #1 emergency contacts list. The PSAP operator can establish a session with a conference application. The PSAP can send an INVITE message to a conference server and can receive a 200 OK message in response. The PSAP can respond with an ACK to the conference server. The PSAP operator can use the application to create the conference. The PSAP can receive an INVITE message from the conference server. The PSAP can respond with a 200 OK message, and can receive an ACK from the conference server in response. At the conference server, a focus can send a re-INVITE message to UE #1. The UE #1 can respond with a 200 OK message to the conference server. The PSAP operator can add UE #2, and the focus at the conference server can dial out to add UE #2 to the conference. The conference server can send an INVITE message to the UE #2. UE #2 can accept the call, and send a 200 OK message to the conference server. The conference server can respond with an ACK to the UE #2. Then, UE #1, the PSAP operator and UE #2 are in conference.

In one example, an INVITE message can be used for manually creating a conference by dialing to a conferencing application. In this conference creation technique, a normal dialog can already be established between the UE #1 and the PSAP. Additional information which is a list of emergency contacts can be available to the PSAP operator during the call setup. The PSAP operator can trigger conference creation through the application (such as an interactive voice response (IVR) system or a web page), which can create a conference focus and send an INVITE to a conference server application. The focus can send a re-INVITE to the user with the conference URI in Contact with the 'isfocus' feature parameter.

In another example, an INVITE message can be used for adding a participant by the focus using a dial-out. For example, on successful creation of the conference, the PSAP operator can trigger an addition of the UE #2 by providing the phone number from the received emergency contact list. The focus can send out an INVITE to UE #2 with a conference id and an isfocus parameter in a Contact header. A user at the UE #2 can accept the call to join the conference with UE #1 and the PSAP operator.

In one example, using the techniques described above, a conference creation is possible during PSAP callback as well. In case an emergency call is dropped, the PSAP operator can choose to setup a conference with the emergency contacts and add a UE in the conference using the PSAP callback.

In an example of a real-life scenario, people with medical problems or people who meet an accident, can somehow manage to place an emergency call but they fail to convey needed information because of trauma, dizziness, unconsciousness etc. In this case, the PSAP operator can make use of emergency contacts received during a call setup and contact relevant people for getting various details, such as medical history, and can possibly provide a remedy before emergency personnel arrive at the scene. Further, if a number of the person's doctor is available in the emergency contact list, PSAP operator can create a conference with the doctor so that direct instructions can be provided to the person in emergency.

In another example of a real-life scenario, an emergency call can be made to a mountain rescue team from a low coverage area and in extreme weather conditions. A location of the caller is not available and the call can get disconnected. In this case, emergency contacts sent during the call can help the rescue team to contact family members and trace the location of the caller.

In yet another example of a real-life scenario, people can call emergency numbers from a device with no SIM or in limited coverage areas. In such cases, PSAP callback generally fails once an emergency call is dropped. Thus, the PSAP operator could reach out to the emergency contacts to get necessary information.

Thus, there are numerous situations where even after reaching the PSAP, all necessary information needed by the operator is not available. In such cases, emergency contacts can play a vital role. Also in certain cases, people on one's emergency contact can reach out and help the victim earlier than emergency personnel.

Figure 9:
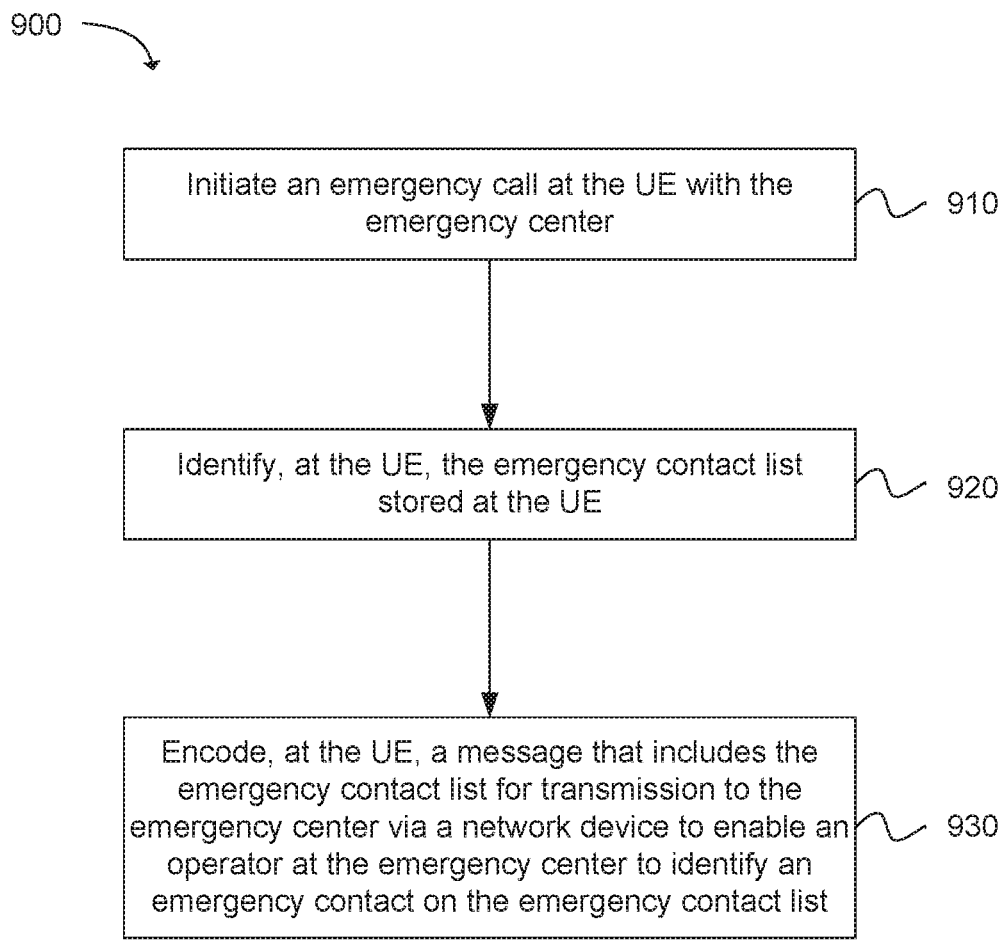
FIG. 9 depicts functionality of a user equipment (UE) operable to encode an emergency contact list for transmission to an emergency center in accordance with an example.

In one configuration, a mechanism is described to provide emergency contact information from an application processor (AP) to a modem via an attention (AT) command. A modem capability for supporting an emergency contact transfer during an emergency call using the AT command can be detected, and an XML body from an emergency contacts list can be constructed. Further, a mechanism is described for using SIP signaling to convey emergency contact support in an INVITE message from a UE and getting back network support in a 200 OK message. Further, a mechanism is described for using SIP signaling for a PSAP to retrieve emergency contacts from the UE using an INFO message. Further, the emergency contact list can be shared in an INVITE request for setting up the emergency call. Further, a mechanism is described for using SIP signaling for creating a conference at the PSAP after getting the emergency contact list from the UE. Further a mechanism is described for using SIP signaling for creating a conference during PSAP callback and adding emergency contacts received from the UE. Further, the network can perform various procedures to obtain ICE information from a USIM on a user's update, and a PSAP can perform various procedures to access ICE information stored in a SIM/HSS Another example provides functionality 900 of a user equipment (UE) operable to encode an emergency contact list for transmission to an emergency center, as shown in FIG. 9. The UE can comprise one or more processors configured to initiate an emergency call at the UE with the emergency center, as in block 910. The UE can comprise one or more processors configured to identify, at the UE, the emergency contact list stored at the UE, as in block 920. The UE can comprise one or more processors configured to encode, at the UE, a message that includes the emergency contact list for transmission to the emergency center via a network device to enable an operator at the emergency center to identify an emergency contact on the emergency contact list, as in block 930. In addition, the UE can comprise a memory interface configured to retrieve from a memory the emergency contact list.

Figure 10:
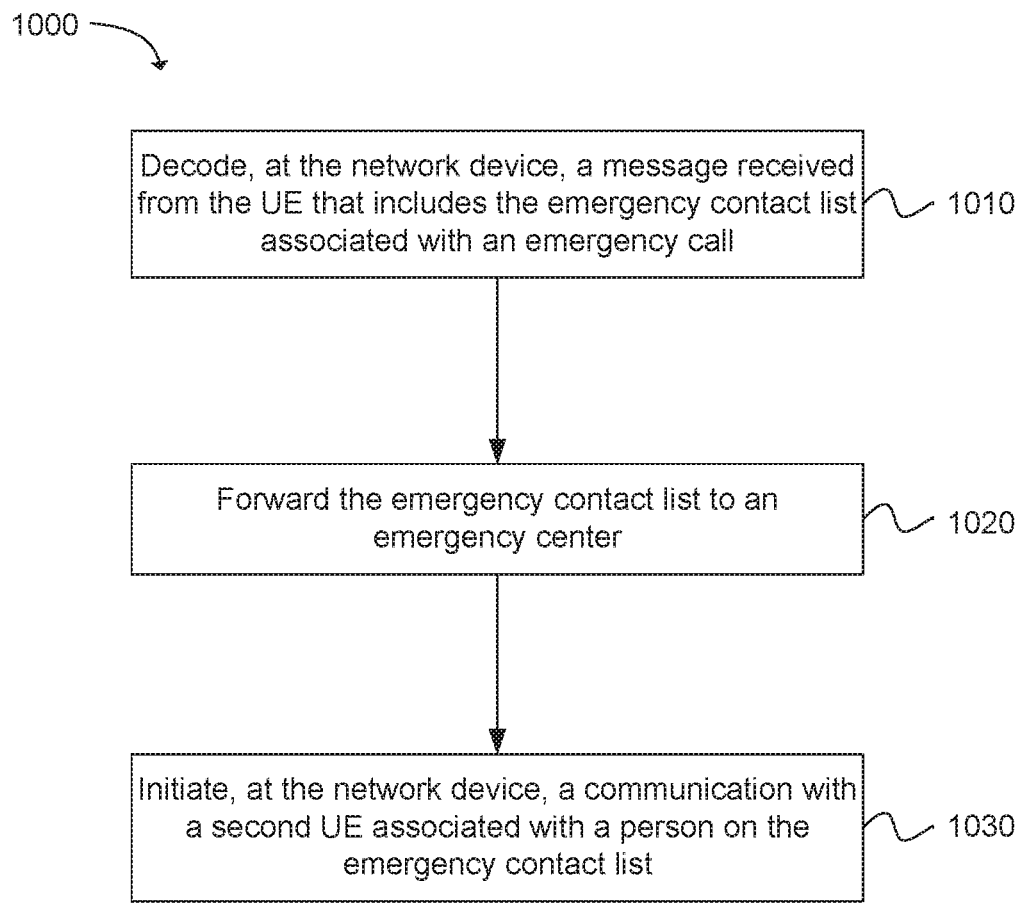
FIG. 10 depicts functionality of a network device operable to decode an emergency contact list received from a user equipment (UE) in accordance with an example.

Another example provides functionality 1000 of a network device operable to decode an emergency contact list received from a user equipment (UE), as shown in FIG. 10. The network device can comprise one or more processors configured to decode, at the network device, a message received from the UE that includes the emergency contact list associated with an emergency call, as in block 1010. The network device can comprise one or more processors configured to forward the emergency contact list to an emergency center, as in block 1020. The network device can comprise one or more processors configured to initiate, at the network device, a communication with a second UE associated with a person on the emergency contact list, as in block 1030. In addition, the network device can comprise a memory interface configured to send to a memory the emergency contact list.

Figure 11:
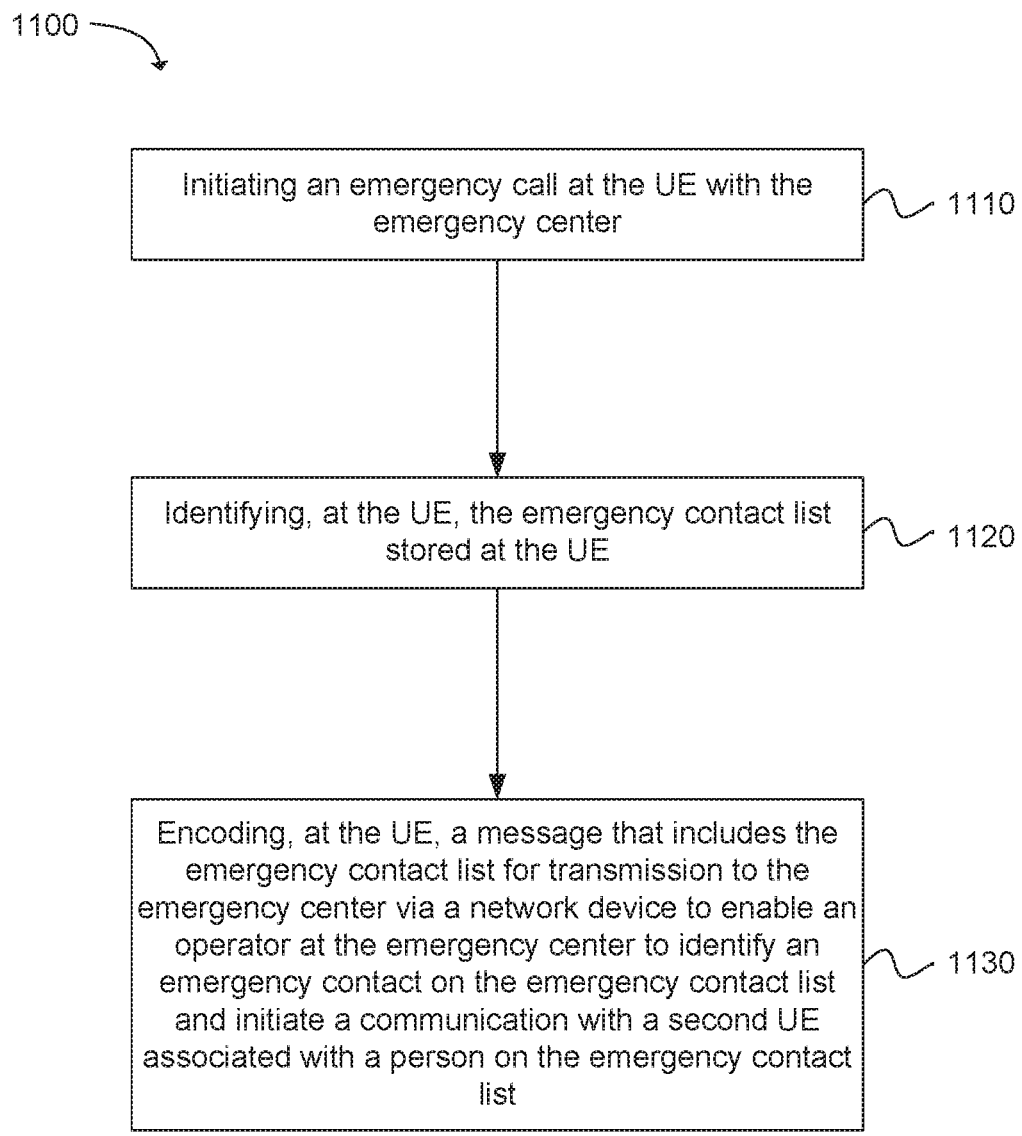
FIG. 11 depicts a flowchart of a machine readable storage medium having instructions embodied thereon for encoding an emergency contact list for transmission from a user equipment (UE) to an emergency center in accordance with an example.

Another example provides at least one machine readable storage medium having instructions 1100 embodied thereon for encoding an emergency contact list for transmission from a user equipment (UE) to an emergency center, as shown in FIG. 11. The instructions can be executed on a machine, where the instructions are included on at least one computer readable medium or one non-transitory machine readable storage medium. The instructions when executed by one or more processors perform: initiating an emergency call at the UE with the emergency center, as in block 1110. The instructions when executed by one or more processors perform: identifying, at the UE, the emergency contact list stored at the UE, as in block 1120. The instructions when executed by one or more processors perform: encoding, at the UE, a message that includes the emergency contact list for transmission to the emergency center via a network device to enable an operator at the emergency center to identify an emergency contact on the emergency contact list and initiate a communication with a second UE associated with a person on the emergency contact list, as in block 1130.

Figure 12:
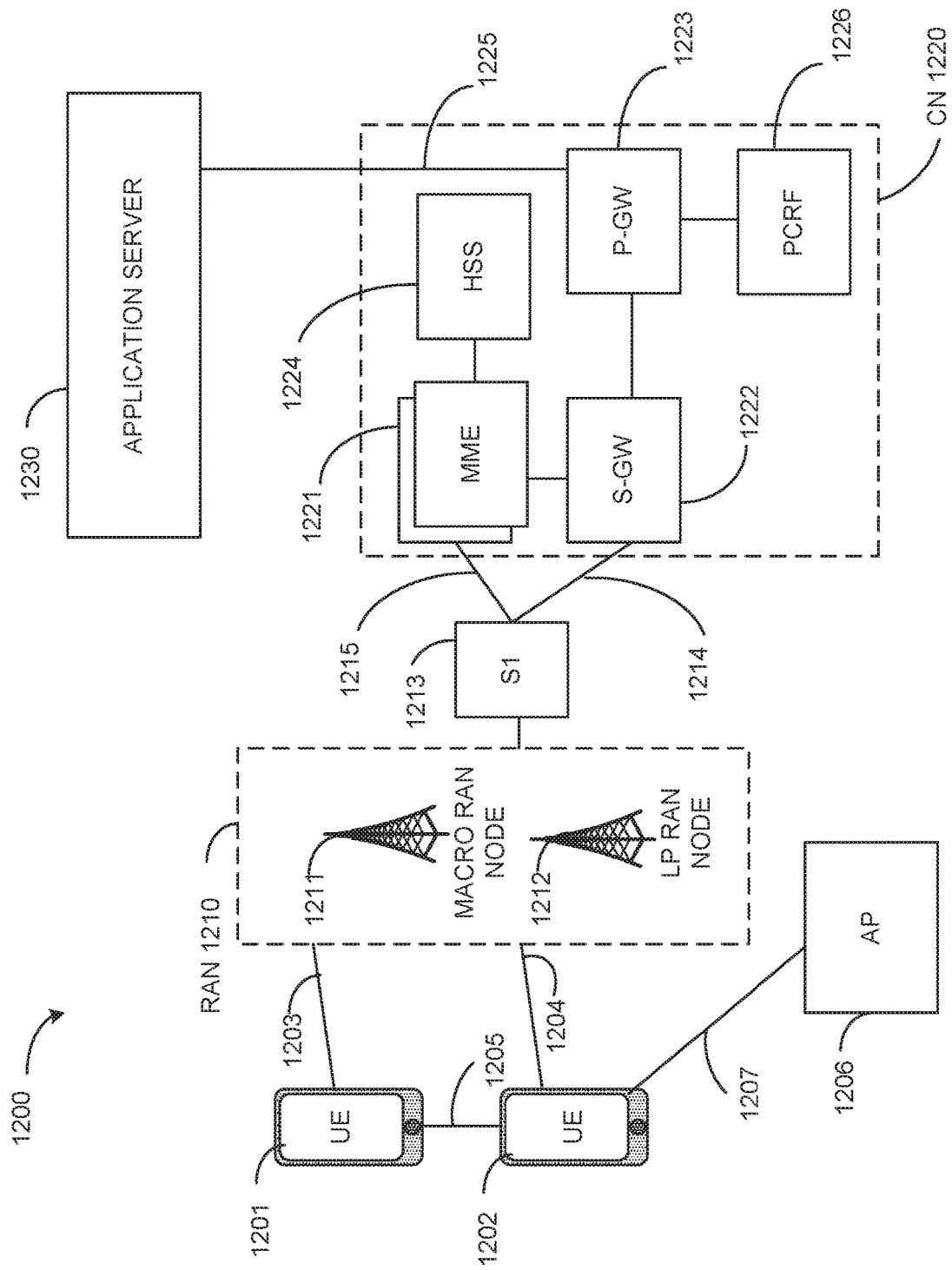
FIG. 12 illustrates an architecture of a wireless network in accordance with an example.

FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 and 1202 may be configured to connect, e.g., communicatively couple, with a radio access network (RAN) 1210—the RAN 1210 may be, for example, an Evolved Universal Mobile Telecommunications System (UMTS) Terrestrial Radio Access Network (E-UTRAN), a NextGen RAN (NG RAN), or some other type of RAN. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 may further directly exchange communication data via a ProSe interface 1205. The ProSe interface 1205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 802.14 protocol, wherein the AP 1206 would comprise a wireless fidelity (WiFi®) router. In this example, the AP 1206 is shown to be connected to the Internet without connecting to the core network of the wireless system (described in further detail below).

The RAN 1210 can include one or more access nodes that enable the connections 1203 and 1204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1210 may include one or more RAN nodes for providing macrocells, e.g., macro RAN node 1211, and one or more RAN nodes for providing femtocells or picocells (e.g., cells having smaller coverage areas, smaller user capacity, or higher bandwidth compared to macrocells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the RAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1201 and 1202. The physical downlink control channel (PDCCH) may carry information about the transport format and resource allocations related to the PDSCH channel, among other things. It may also inform the UEs 1201 and 1202 about the transport format, resource allocation, and H-ARQ (Hybrid Automatic Repeat Request) information related to the uplink shared channel. Typically, downlink scheduling (assigning control and shared channel resource blocks to the UE 1201 within a cell) may be performed at any of the RAN nodes 1211 and 1212 based on channel quality information fed back from any of the UEs 1201 and 1202. The downlink resource assignment information may be sent on the PDCCH used for (e.g., assigned to) each of the UEs 1201 and 1202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1210 is shown to be communicatively coupled to a core network (CN) 1220—via an S1 interface 1213. In embodiments, the CN 1220 may be an evolved packet core (EPC) network, a NextGen Packet Core (NPC) network, or some other type of CN. In this embodiment the S1 interface 1213 is split into two parts: the S1-U interface 1214, which carries traffic data between the RAN nodes 1211 and 1212 and the serving gateway (S-GW) 1222, and the S1-mobility management entity (MME) interface 1215, which is a signaling interface between the RAN nodes 1211 and 1212 and MMEs 1221.

In this embodiment, the CN 1220 comprises the MMEs 1221, the S-GW 1222, the Packet Data Network (PDN) Gateway (P-GW) 1223, and a home subscriber server (HSS) 1224. The MMEs 1221 may be similar in function to the control plane of legacy Serving General Packet Radio Service (GPRS) Support Nodes (SGSN). The MMEs 1221 may manage mobility aspects in access such as gateway selection and tracking area list management. The HSS 1224 may comprise a database for network users, including subscription-related information to support the network entities' handling of communication sessions. The CN 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 may terminate the S1 interface 1213 towards the RAN 1210, and routes data packets between the RAN 1210 and the CN 1220. In addition, the S-GW 1222 may be a local mobility anchor point for inter-RAN node handovers and also may provide an anchor for inter-3GPP mobility. Other responsibilities may include lawful intercept, charging, and some policy enforcement.

The P-GW 1223 may terminate an SGi interface toward a PDN. The P-GW 1223 may route data packets between the EPC network 1223 and external networks such as a network including the application server 1230 (alternatively referred to as application function (AF)) via an Internet Protocol (IP) interface 1225. Generally, the application server 1230 may be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the CN 1220.

The P-GW 1223 may further be a node for policy enforcement and charging data collection. Policy and Charging Enforcement Function (PCRF) 1226 is the policy and charging control element of the CN 1220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate Quality of Service (QoS) and charging parameters. The PCRF 1226 may provision this rule into a Policy and Charging Enforcement Function (PCEF) (not shown) with the appropriate traffic flow template (TFT) and QoS class of identifier (QCI), which commences the QoS and charging as specified by the application server 1230.

Figure 13:
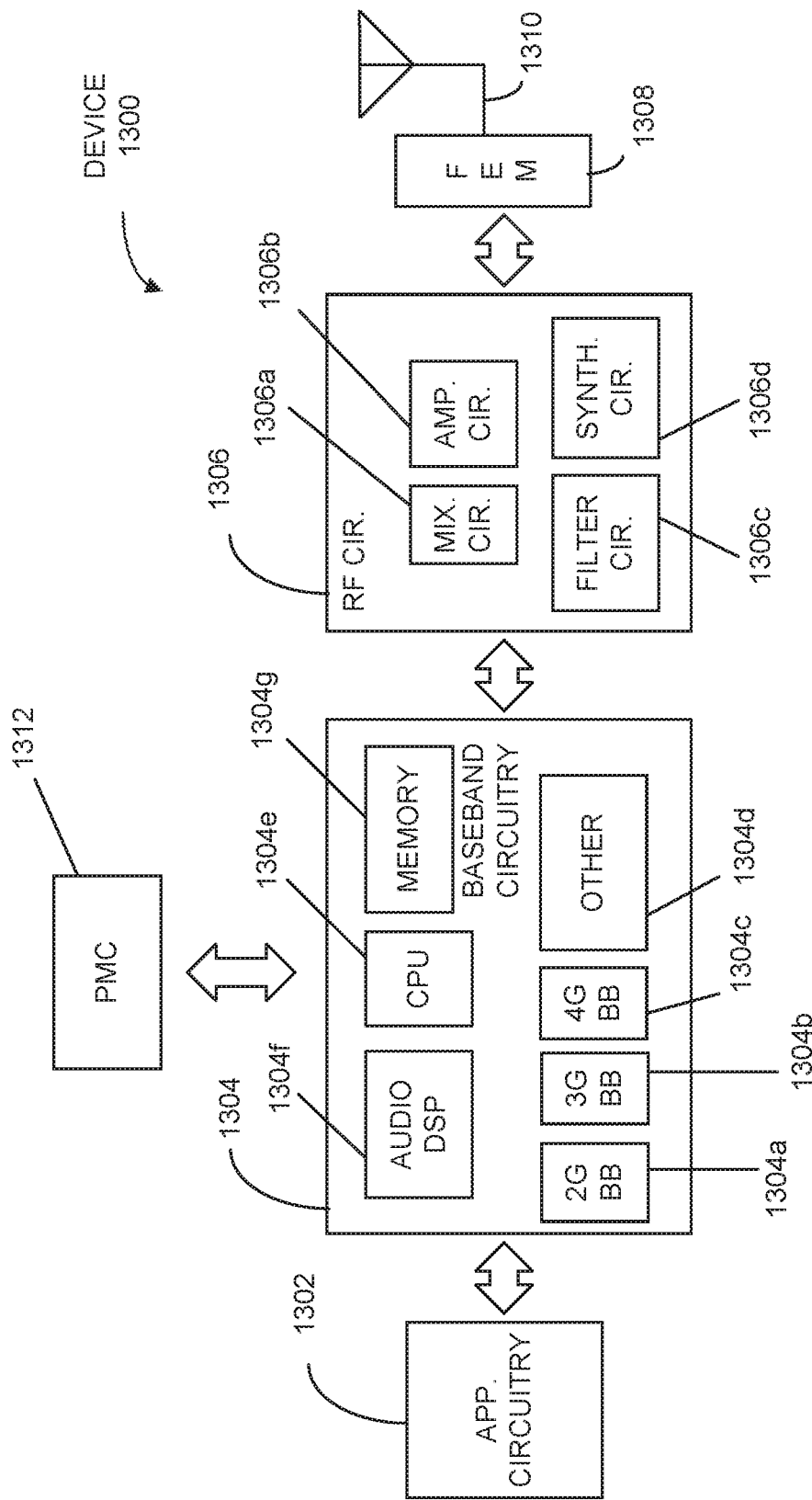
FIG. 13 illustrates a diagram of a wireless device (e.g., UE) in accordance with an example.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304a, a fourth generation (4G) baseband processor 1304b, a fifth generation (5G) baseband processor 1304c, or other baseband processor(s) 1304d for other existing generations, generations in development or to be developed in the future (e.g., second generation (2G), sixth generation (6G), etc.). The baseband circuitry 1304 (e.g., one or more of baseband processors 1304a-d) may handle various radio control functions that enable communication with one or more radio networks via the RF circuitry 1306. In other embodiments, some or all of the functionality of baseband processors 1304a-d may be included in modules stored in the memory 1304g and executed via a Central Processing Unit (CPU) 1304e. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304f. The audio DSP(s) 1304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the application circuitry 1302 depending on the desired output frequency. In some embodiments, a divider control input (e.g., N) may be determined from a look-up table based on a channel indicated by the application circuitry 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM circuitry 1308, or in both the RF circuitry 1306 and the FEM circuitry 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM circuitry 1308.

In some embodiments, the PMC 1312 may control, or otherwise be part of, various power saving mechanisms of the device 1300. For example, if the device 1300 is in an RRC Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
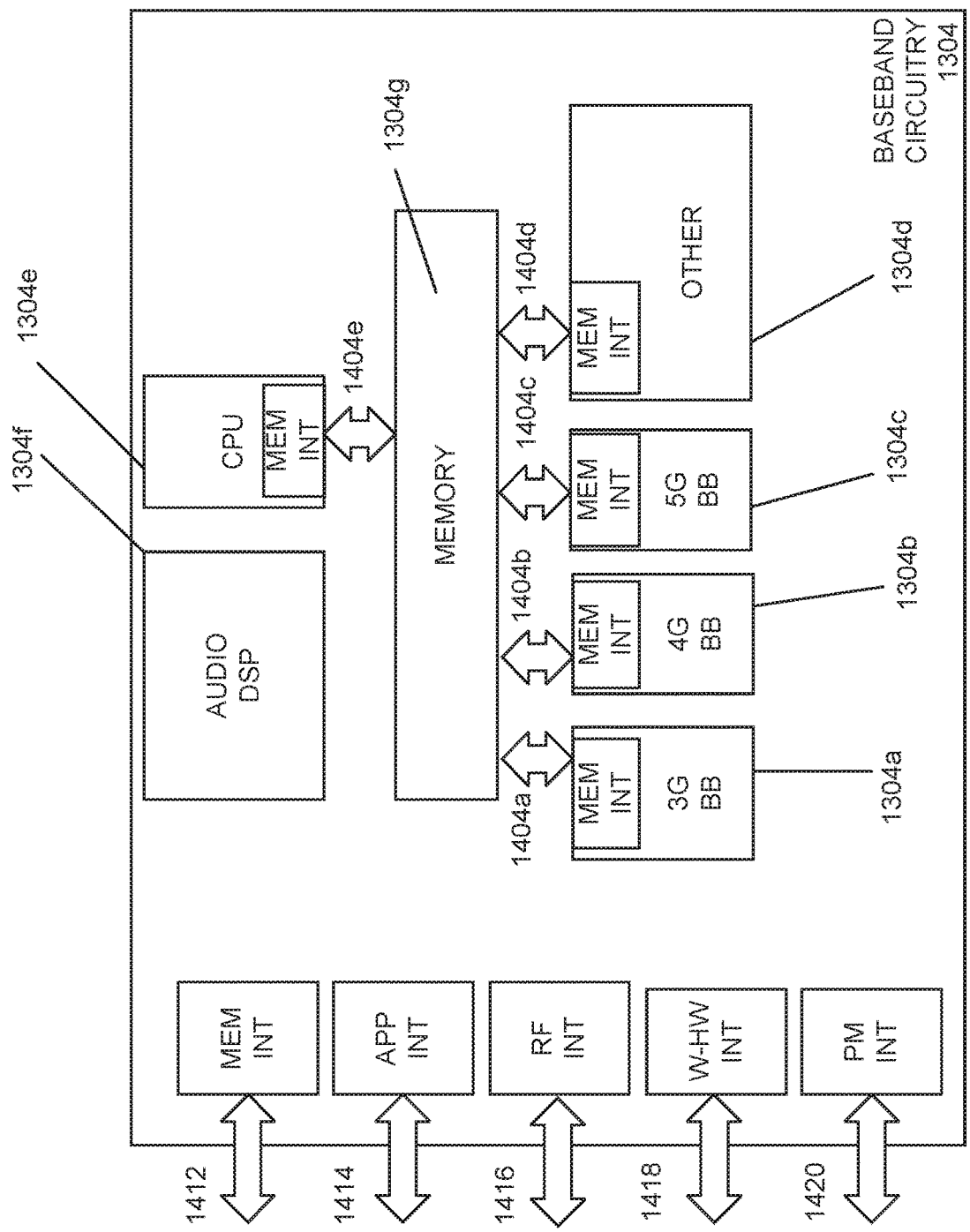
FIG. 14 illustrates interfaces of baseband circuitry in accordance with an example.

FIG. 14 illustrates example interfaces of baseband circuitry in accordance with some embodiments. As discussed above, the baseband circuitry 1304 of FIG. 13 may comprise processors 1304*a*-1304*e* and a memory 1304*g* utilized by said processors. Each of the processors 1304*a*-1304*e* may include a memory interface, 1404*a*-1404*e*, respectively, to send/receive data to/from the memory 1304*g*.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

FIG. 15 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 15 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to encode an emergency contact list for transmission to an emergency center, the apparatus comprising: one or more processors configured to: initiate an emergency call at the UE with the emergency center; identify, at the UE, the emergency contact list stored at the UE; and encode, at the UE, a message that includes the emergency contact list for transmission to the emergency center via a network device to enable an operator at the emergency center to identify an emergency contact on the emergency contact list; and a memory interface configured to retrieve from a memory the emergency contact list.

Example 2 includes the apparatus of Example 1, further comprising a transceiver configured to transmit the message that includes the emergency contact list to the emergency center via the network device.

Example 3 includes the apparatus of any of Examples 1 to 2, wherein the message that includes the emergency contact list enables the operator at the emergency center to initiate a communication with a second UE associated with a person on the emergency contact list.

Example 4 includes the apparatus of any of Examples 1 to 3, wherein the one or more processors are configured to: encode an INVITE emergency message for transmission to the emergency center via the network device, wherein the INVITE emergency message indicates that the UE is capable of sending the emergency contact list to the network device, wherein the network device is an Internet Protocol (IP) Multimedia Subsystem (IMS); and decode a 200 OK message received from the emergency center via the network device, wherein the 200 OK message indicates the emergency center is capable of retrieving and processing the emergency contact list from the UE.

Example 5 includes the apparatus of any of Examples 1 to 4, wherein the one or more processors are configured to: establish the emergency call between the UE and the emergency center via the network device after the 200 OK message is received at the UE.

Example 6 includes the apparatus of any of Examples 1 to 5, wherein the one or more processors are configured to: decode an INFO request message received from the emergency center via the network device that includes a request for sending the emergency contact list; and wherein the message that includes the emergency contact list is an INFO message.

Example 7 includes the apparatus of any of Examples 1 to 6, wherein: the message that includes the emergency contact list is an INVITE emergency message; and the one or more processors are configured to: decode a 200 OK message received from the emergency center via the network device after the INVITE message is received at the emergency center; encode an acknowledgement (ACK) for transmission to the emergency center via the network device; and establish the emergency call between the UE and the emergency center via the network device after the 200 OK message is received at the UE and the ACK is transmitted from the UE.

Example 8 includes the apparatus of any of Examples 1 to 7, wherein the emergency contact list is an Extensible Markup Language (XML)-formatted contact list.

Example 9 includes the apparatus of any of Examples 1 to 8, wherein a receipt of the emergency contact list causes a public safety answering point (PSAP) operator at the emergency center to create a conference with a person on the emergency contact list via a second UE using session initiation protocol (SIP) signaling with a conference server.

Example 10 includes the apparatus of any of Examples 1 to 9, wherein a public safety answering point (PSAP) operator at the emergency center is enabled to create a conference during a PSAP callback using session initiation protocol (SIP) signaling with a conference server and add one or more of the UE or a second UE associated with a person on the emergency contact list using the PSAP callback.

Example 11 includes an apparatus of a network device operable to decode an emergency contact list received from a user equipment (UE), the apparatus comprising: one or more processors configured to: decode, at the network device, a message received from the UE that includes the emergency contact list associated with an emergency call; forward the emergency contact list to an emergency center; and initiate, at the network device, a communication with a second UE associated with a person on the emergency contact list; and a memory interface configured to send to a memory the emergency contact list.

Example 12 includes the apparatus of Example 11, further comprising a transceiver configured to receive the message that includes the emergency contact list from the UE.

Example 13 includes the apparatus of any of Examples 11 to 12, wherein the network device is an Internet Protocol (IP) Multimedia Subsystem (IMS).

Example 14 includes the apparatus of any of Examples 11 to 13, wherein the one or more processors are configured to: decode an INVITE emergency message received from the UE, wherein the INVITE emergency message indicates that the UE is capable of sending the emergency contact list to the network device; forward the INVITE emergency message to the emergency center; and encode a 200 OK message for transmission to the UE, wherein the 200 OK message indicates the emergency center is capable of retrieving and processing the emergency contact list from the UE.

Example 15 includes the apparatus of any of Examples 11 to 14, wherein the one or more processors are configured to:

establish the emergency call between the UE and the emergency center after the 200 OK message is transmitted to the UE.

Example 16 includes the apparatus of any of Examples 11 to 15, wherein the one or more processors are configured to: decode an INFO request message received from the emergency center that includes a request for the emergency contact list; and forward the INFO request message to the UE, wherein the message that includes the emergency contact list is an INFO message.

Example 17 includes the apparatus of any of Examples 11 to 16, wherein: the message that includes the emergency contact list is an INVITE emergency message; and the one or more processors are configured to: encode a 200 OK message for transmission to the UE after the INVITE message is received at the network device; decode an acknowledgement (ACK) received from the UE; and establish the emergency call between the UE and the emergency center after the 200 OK message is transmitted to the UE and the ACK is received from the UE.

Example 18 includes the apparatus of any of Examples 11 to 17, wherein the emergency contact list is an Extensible Markup Language (XML)-formatted contact list.

Example 19 includes at least one machine readable storage medium having instructions embodied thereon for encoding an emergency contact list for transmission from a user equipment (UE) to an emergency center, the instructions when executed by one or more processors perform the following: initiating an emergency call at the UE with the emergency center; identifying, at the UE, the emergency contact list stored at the UE; and encoding, at the UE, a message that includes the emergency contact list for transmission to the emergency center via a network device to enable an operator at the emergency center to identify an emergency contact on the emergency contact list and initiate a communication with a second UE associated with a person on the emergency contact list.

Example 20 includes the at least one machine readable storage medium of Example 19, further comprising instructions when executed perform the following: encoding an INVITE emergency message for transmission to the emergency center via the network device, wherein the INVITE emergency message indicates that the UE is capable of sending the emergency contact list to the network device, wherein the network device is an Internet Protocol (IP) Multimedia Subsystem (IMS); and decoding a 200 OK message received from the emergency center via the network device, wherein the 200 OK message indicates the emergency center is capable of retrieving and processing the emergency contact list from the UE.

Example 21 includes the at least one machine readable storage medium of any of Examples 19 to 20, further comprising instructions when executed perform the following: establishing the emergency call between the UE and the emergency center via the network device after the 200 OK message is received at the UE.

Example 22 includes the at least one machine readable storage medium of any of Examples 19 to 21, further comprising instructions when executed perform the following: decoding an INFO request message received from the emergency center via the network device that includes a request for the emergency contact list; and encoding a 200 OK message for transmission to the emergency center via the network device, wherein the message that includes the emergency contact list is an INFO message.

Example 23 includes the at least one machine readable storage medium of any of Examples 19 to 22, wherein: the message that includes the emergency contact list is an INVITE emergency message; and further comprising instructions when executed perform the following: decoding a 200 OK message received from the emergency center via the network device after the INVITE message is received at the emergency center; encoding an acknowledgement (ACK) for transmission to the emergency center via the network device; and establishing the emergency call between the UE and the emergency center via the network device after the 200 OK message is received at the UE and the ACK is transmitted from the UE.

Example 24 includes the at least one machine readable storage medium of any of Examples 19 to 23, wherein the emergency contact list is an Extensible Markup Language (XML)-formatted contact list.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to encode an emergency contact list for transmission to an emergency center, the apparatus comprising:
   one or more processors configured to:
      initiate an emergency call at the UE with the emergency center;
      identify, at the UE, the emergency contact list stored at the UE; and
      encode, at the UE, an INVITE emergency message for transmission to the emergency center via a network device, wherein the INVITE emergency message indicates that the UE is capable of sending the emergency contact list to the network device; and
      encode, at the UE, a message that includes the emergency contact list for transmission to the emergency center via a network device to enable an operator at the emergency center to identify an emergency contact on the emergency contact list; and
   a memory interface configured to retrieve from a memory the emergency contact list.

2. The apparatus of claim 1, further comprising a transceiver configured to transmit the message that includes the emergency contact list to the emergency center via the network device.

3. The apparatus of claim 1, wherein the message that includes the emergency contact list enables the operator at the emergency center to initiate a communication with a second UE associated with a person on the emergency contact list.

4. The apparatus of claim 1,
   wherein the network device is an Internet Protocol (IP) Multimedia Subsystem (IMS); and wherein the one or more processors are configured to:
   decode a 200 OK message received from the emergency center via the network device, wherein the 200 OK message indicates the emergency center is capable of retrieving and processing the emergency contact list from the UE.

5. The apparatus of claim 4, wherein the one or more processors are configured to: establish the emergency call between the UE and the emergency center via the network device after the 200 OK message is received at the UE.

6. The apparatus of claim 1, wherein the one or more processors are configured to:
   decode an INFO request message received from the emergency center via the network device that includes a request for sending the emergency contact list; and
   wherein the message that includes the emergency contact list is an INFO message.

7. The apparatus of claim 1, wherein the one or more processors are configured to:
   decode a 200 OK message received from the emergency center via the network device after the INVITE message is received at the emergency center;
   encode an acknowledgement (ACK) for transmission to the emergency center via the network device; and
   establish the emergency call between the UE and the emergency center via the network device after the 200 OK message is received at the UE and the ACK is transmitted from the UE.

8. The apparatus of claim 1, wherein the emergency contact list is an Extensible Markup Language (XML)-formatted contact list.

9. The apparatus of claim 1, wherein a receipt of the emergency contact list causes a public safety answering point (PSAP) operator at the emergency center to create a conference with a person on the emergency contact list via a second UE using session initiation protocol (SIP) signaling with a conference server.

10. The apparatus of claim 1, wherein a public safety answering point (PSAP) operator at the emergency center is enabled to create a conference during a PSAP callback using session initiation protocol (SIP) signaling with a conference server and add one or more of the UE or a second UE associated with a person on the emergency contact list using the PSAP callback.

11. An apparatus of a network device operable to decode an emergency contact list received from a user equipment (UE), the apparatus comprising:
one or more processors configured to:
decode, at the network device, an INVITE emergency message received from the UE, wherein the INVITE emergency message indicates that the UE is capable of sending the emergency contact list to the network device;
decode, at the network device, a message received from the UE that includes the emergency contact list associated with an emergency call; and
forward the emergency contact list to an emergency center; and
initiate, at the network device, a communication with a second UE associated with a person on the emergency contact list; and
a memory interface configured to send to a memory the emergency contact list.

12. The apparatus of claim 11, further comprising a transceiver configured to receive the message that includes the emergency contact list from the UE.

13. The apparatus of claim 11, wherein the network device is an Internet Protocol (IP) Multimedia Subsystem (IMS).

14. The apparatus of claim 11, wherein the one or more processors are configured to:
forward the INVITE emergency message to the emergency center; and
encode a 200 OK message for transmission to the UE, wherein the 200 OK message indicates the emergency center is capable of retrieving and processing the emergency contact list from the UE.

15. The apparatus of claim 14, wherein the one or more processors are configured to: establish the emergency call between the UE and the emergency center after the 200 OK message is transmitted to the UE.

16. The apparatus of claim 11, wherein the one or more processors are configured to:
decode an INFO request message received from the emergency center that includes a request for the emergency contact list; and
forward the INFO request message to the UE,
wherein the message that includes the emergency contact list is an INFO message.

17. The apparatus of claim 11, wherein: the one or more processors are configured to:
encode a 200 OK message for transmission to the UE after the INVITE message is received at the network device;
decode an acknowledgement (ACK) received from the UE; and
establish the emergency call between the UE and the emergency center after the 200 OK message is transmitted to the UE and the ACK is received from the UE.

18. The apparatus of claim 11, wherein the emergency contact list is an Extensible Markup Language (XML)-formatted contact list.

19. At least one non-transitory machine readable storage medium having instructions embodied thereon for encoding an emergency contact list for transmission from a user equipment (UE) to an emergency center, the instructions when executed by one or more processors perform the following:
initiating an emergency call at the UE with the emergency center;
identifying, at the UE, the emergency contact list stored at the UE; and
encoding an INVITE emergency message for transmission to the emergency center via the network device, wherein the INVITE emergency message indicates that the UE is capable of sending the emergency contact list to the network device; and
encoding, at the UE, a message that includes the emergency contact list for transmission to the emergency center via a network device to enable an operator at the emergency center to identify an emergency contact on the emergency contact list and initiate a communication with a second UE associated with a person on the emergency contact list.

20. The at least one non-transitory machine readable storage medium of claim 19,
wherein the network device is an Internet Protocol (IP) Multimedia Subsystem (IMS); and further comprising instructions when executed perform the following:
decoding a 200 OK message received from the emergency center via the network device, wherein the 200 OK message indicates the emergency center is capable of retrieving and processing the emergency contact list from the UE.

* * * * *